US012728623B2

(12) United States Patent
Gleyal et al.

(10) Patent No.: US 12,728,623 B2
(45) **Date of Patent: *Sep. 8, 2026**

(54) REFORMABLE EPOXY RESIN FOR COMPOSITES AND METHODS THEREOF

(71) Applicant: Zephyros, Inc.

(72) Inventors: Sylvain Gleyal, West Bloomfield, MI (US); Craig Chmielewski, Shelby Township, MI (US); Brandon Madaus, Shelby Township, MI (US); Alejandro Gutierrez, Romeo, MI (US)

(73) Assignee: ZEPHYROS, INC., Romeo, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/171,694

(22) Filed: Apr. 7, 2025

(65) Prior Publication Data

US 2025/0229506 A1 Jul. 17, 2025

Related U.S. Application Data

(60) Continuation of application No. 18/112,899, filed on Feb. 22, 2023, now Pat. No. 12,280,582, which is a division of application No. 14/826,345, filed on Aug. 14, 2015, now abandoned.

(60) Provisional application No. 62/037,199, filed on Aug. 14, 2014.

(51) Int. Cl.

| | |
|---|---|
| ***B32B 7/12*** | (2006.01) |
| ***B29C 43/18*** | (2006.01) |
| ***B29C 70/00*** | (2006.01) |
| ***B29C 70/30*** | (2006.01) |
| ***B32B 21/04*** | (2006.01) |
| ***B32B 21/08*** | (2006.01) |
| ***B32B 27/08*** | (2006.01) |
| ***B32B 37/02*** | (2006.01) |
| ***B32B 37/10*** | (2006.01) |
| ***B32B 37/12*** | (2006.01) |
| *B29K 63/00* | (2006.01) |
| *F41H 1/08* | (2006.01) |
| *F41H 5/08* | (2006.01) |

(52) U.S. Cl.

CPC ................ *B32B 7/12* (2013.01); *B29C 43/18* (2013.01); *B29C 70/003* (2021.05); *B29C 70/30* (2013.01); *B32B 21/04* (2013.01); *B32B 21/042* (2013.01); *B32B 21/08* (2013.01); *B32B 27/08* (2013.01); *B32B 37/02* (2013.01); *B32B 37/10* (2013.01); *B32B 37/1207* (2013.01); *B32B 37/1284* (2013.01); *B29K 2063/00* (2013.01); *B32B 2250/02* (2013.01); *B32B 2260/046* (2013.01); *B32B 2307/738* (2013.01); *B32B 2307/75* (2013.01); *B32B 2363/00* (2013.01); *B32B 2479/00* (2013.01); *B32B 2605/00* (2013.01); *B32B 2605/18* (2013.01); *F41H 1/08* (2013.01); *F41H 5/08* (2013.01)

(58) Field of Classification Search

None

See application file for complete search history.

(56) References Cited

U.S. PATENT DOCUMENTS

| | | | | |
|---|---|---|---|---|
| 3,317,471 | A | 5/1967 | Johnson et al. | |
| 4,046,937 | A * | 9/1977 | McCaskey, Jr. | B32B 27/04 428/524 |
| 4,438,254 | A | 3/1984 | Doorakian et al. | |
| 4,443,507 | A | 4/1984 | Yamada | |
| 4,647,648 | A | 3/1987 | Silvis et al. | |
| 5,115,075 | A | 5/1992 | Brennan et al. | |
| 5,378,544 | A | 1/1995 | Gnatowski | |
| 5,702,556 | A | 12/1997 | Okuma | |
| 6,011,111 | A | 1/2000 | Brennan et al. | |
| 2002/0006755 | A1 | 1/2002 | North et al. | |
| 2003/0220036 | A1* | 11/2003 | Lee | D21H 27/10 442/295 |
| 2007/0026182 | A1 | 2/2007 | Winterowd | |
| 2007/0190284 | A1 | 8/2007 | Park | |
| 2007/0270515 | A1 | 11/2007 | Chmielewski et al. | |
| 2008/0020200 | A1 | 1/2008 | Stokes | |
| 2010/0310877 | A1 | 12/2010 | Parker | |
| 2012/0048451 | A1 | 3/2012 | Carlson | |
| 2012/0202041 | A1* | 8/2012 | Kasmayr | B32B 21/13 428/313.5 |
| 2013/0291469 | A1 | 11/2013 | Verscheure | |

FOREIGN PATENT DOCUMENTS

| | | | | |
|---|---|---|---|---|
| EP | 0740020 | A1 * | 10/1996 | D21H 5/1218 |
| JP | 59199246 | A * | 11/1984 | |
| WO | 98/14498 | A1 | 4/1998 | |
| WO | 2008/078003 | A1 | 7/2008 | |

OTHER PUBLICATIONS

Wang et al., Syntheses and characterizations of thermally reworkable epoxy resins II, Polymer Chemistry, vol. 38, Issue20, Oct. 15, 2000, pp. 3771-3782.*

(Continued)

*Primary Examiner* — Yung-Sheng M Tsui

*Assistant Examiner* — Melody Tsai

(74) *Attorney, Agent, or Firm* — The Dobrusin Law Firm, P.C.

(57) ABSTRACT

The present invention contemplates a method for forming a composite structure including a plurality of rigid layers and one or more reformable epoxy resin layers. The resulting composite is molded to form a non-planar composite structure.

19 Claims, No Drawings

(56) References Cited

OTHER PUBLICATIONS

Memon et al, Recyclable and reformable epoxy resins based on dynamic covalent bonds—Present, past, and future, Polymer Testing, vol. 105, Jan. 2022, 107420.*
International Search Report and Written Opinion from the European Patent Office for Application No. PCT/US2015/045196, mailed Oct. 23, 2015.
Verma et al., Development of Layered Laminate Composite and Their Mechanical Properties, Composite Part B Engineering 43(3): 1063-1069, Apr. 2012.
FactsAboutBPA, Industrial & Business, available at http://www.factsaboutbpa.org/benefits-applications/inustrial-business Published Aug. 28, 2013.
New World Encyclopedia, Epoxy, available at http://www.newworldencyclopedia.org/entry/Epoxy published Jun. 19, 2013.

* cited by examiner

REFORMABLE EPOXY RESIN FOR COMPOSITES AND METHODS THEREOF

CLAIM OF PRIORITY

The present patent application is a continuation patent application of U.S. patent application Ser. No. 18/112,899 filed on Feb. 22, 2023, which is a divisional patent application of U.S. patent application Ser. No. 14/826,345 filed on Aug. 14, 2015, which is a non-provisional patent application of U.S. Provisional Patent Application No. 62/037,199 filed on Aug. 14, 2014. This patent application claims priority to U.S. patent application Ser. No. 18/112,899 (published as US 2023/0211578 A1 on Jul. 6, 2023) and Ser. No. 14/826,345 (published as US 2016/0046047 A1 on Feb. 18, 2016) and U.S. Provisional Patent Application No. 62/037,199, each incorporated herein by reference in its entirety.

TECHNICAL FIELD

The present invention pertains generally to reformable epoxy resins for use in composites, and more particularly to reformable epoxy resin adhesives layered between material layers whereby the reformable epoxy resin permits shaping and re-shaping of the composite structures without adhesive failure of the adhesive or breaking of the material layers.

BACKGROUND

Composite structures are common in a wide variety of industries including building construction, sporting equipment, furniture, automotive, train, aerospace (and other transportation vehicles) among others. It is common to use composite structures due to their high strength and the variety of materials that can be utilized for the various composite layers. However, it is challenging to identify materials that provide sufficient strength and also sufficient cohesion with adjacent material layers, especially when it is desirable to mold or shape the composite structures. Thus, there are often significant limitations on the ability to curve, mold and form composite structures having both sufficient strength and sufficient cohesion. Further, the ability to mold complex shapes may be limited by the adhesive used to form the composite, such that the adhesive fails to adhere the layers when the composite structure is molded. Such adhesives also prevent reforming of a composite structure into a different shape after initial forming of the composite structure.

There is thus a need for an adhesive that avoids these common problems encountered with forming composite structures into curved and/or complex shapes.

SUMMARY OF THE INVENTION

The teachings herein are directed to a method comprising forming a substantially planar composite structure having at least two layers, applying a reformable epoxy resin material onto one or more of the at least two layers, optionally cutting the composite structure to a desired shape and heating the composite structure in a mold to form a non-planar composite structure.

The reformable epoxy resin material may fall below its glass transition temperature upon exposure to ambient temperature in less than 5 minutes. After the reformable epoxy resin material falls below its glass transition temperature, it may be heated multiple times above its glass transition temperature for molding into the non-planar composite structure. The reformable epoxy resin material falls below its glass transition temperature upon exposure to ambient temperature.

The composite structure may be a furniture panel. The composite structure may be an automotive or aerospace panel. The reformable epoxy resin material may fall below its glass transition temperature prior to forming the non-planar composite structure. At least one of the at least two layers may be a wood material. At least one of the at least two layers may be a polymeric material. At least one of the at least two layers may be a cellulosic material. The reformable epoxy resin material may be stored at room temperature prior to use. The shelf life of the reformable epoxy resin material may be at least about 3 months, at least about 6 months, at least about 1 year, or even at least about 5 years.

The reformable epoxy resin material may be recyclable. The glass transition temperature of the reformable epoxy resin material may be higher than room temperature but lower than 200° C. The reformable epoxy resin material can be processed at a temperature of less than 200° C., or even less than 150° C. The stiffness of the reformable epoxy resin material may be substantially higher than the stiffness of a thermoplastic material without an epoxy component. The reformable epoxy resin material may be capable of receiving printed material prior to forming the composite structure whereby the printed material can be clearly viewed after formation of the composite structure. The resulting composite structure may be stampable. The resulting composite structure may include natural fiber materials. The resulting composite structure does not fail at greater than 2.5% strain during a three point bend test. The resulting composite structure does not fail at greater than 3.5% strain during a three point bend test.

The teachings herein facilitate a simple process for forming and shaping composites structures using a reformable epoxy resin adhesive. The composite structures are formed such that the material layers will fail during a curving or molding process before the adhesive material fails. The resulting composite structures are thus stronger than similar structures made using a typical thermoplastic material, and also more flexible (e.g., moldable, shapeable and/or stampable) than similar structures made using a typical epoxy-based thermoset material.

DETAILED DESCRIPTION

The present teachings meet one or more of the above needs by the improved composite structures and methods described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application claims the benefit of the filing date of U.S. Provisional Application No. 62/037,199, filed Aug. 14, 2014, the entirety of the contents of this application being hereby incorporated by reference for all purposes.

The teachings herein make advantageous use of a reformable epoxy resin epoxy adhesive that hardens and adheres when it cools. The teachings herein contemplate a method for providing composite structures that are formable and moldable after the reformable epoxy resin material is heated and subsequently falls below its glass transition temperature. The reformable epoxy resin adhesive provides structural toughness associated with epoxy materials, but is amenable to molding and re-molding after cure unlike other epoxy-based adhesive materials. Thermoplastic films are known in the art of composite structure formation, but such films typically fail to provide sufficient adhesion and stiffness. Reformable epoxy resin adhesives for use in composite structures provide additional stiffness, adhesion and allow for reforming and are therefore useful for composites that are formed to have curved profiles.

The materials and methods taught herein include possible uses for reformable epoxy resin (RER) materials. It is possible that the RER materials may be provided initially in a pellet form and then formed into an RER film. Accordingly, a reformable epoxy resin may be desirable because of its long shelf life, which may be in pelletized form or in a film form, or in an alternative adhesive form. It also may not require storage at a refrigerated temperature, unlike some alternative materials. The shelf life of the reformable epoxy resin material is at least about 3 months, at least about 6 months, at least about 1 year, or even at least about 5 years.

Typically, the use of epoxy-based adhesives provides for composite materials that can endure minimal curving based on the relatively brittle nature of the epoxy adhesives. As a result, the amount of curving that a composite structure can withstand without cohesive failure is controlled by the adhesive. However, the amount of curving that a composite structure can withstand when formed with the adhesives described herein is controlled by the material layers that receive the adhesive.

An advantage of the present teachings over existing epoxy materials used for adhesives is that the materials herein have improved strength and adhesion as compared to typical thermoplastic materials and are also significantly more flexible than other epoxy-based adhesives. Further, the RER adhesive can be easily and selectively removed by the addition of heat. Thus, a composite material formed using an RER adhesive could be shaped and reshaped by the addition of heat, as required. The removed RER adhesive may also be recyclable and thus re-used. Additional benefits of the RER material include fast hardening and adhesion, and also the ability to remove the adhesive and re-mold any composite formed with the adhesive. Adhesion, hardening, and returning to a solid state upon cooling of the RER begins almost immediately after heating is stopped. Full adhesion can occur within about 10 seconds to about 60 seconds (e.g., about 30 seconds). It is contemplated that allowing the adhesive to return to ambient temperature is sufficient for adhesion, and additional hardening steps are possible, but not necessary.

Exemplary RER materials are made using bisphenol A diglycidyl ether (BADGE) and monoethanolamine. For some applications that may require a higher glass transition temperature ($T_g$), it is contemplated that BADGE may be replaced by an epoxy monomer with less mobility. Such epoxy monomers may include diglycidylether of fluoren diphenol or 1,6 napthalene diepoxy. Also, it is contemplated that where fire resistance is desired, BADGE can be replaced by a brominated bisphenol A epoxy resin. The RER material having at least one epoxide group may be hydroxy-phenoxyether polymer, such as a polyetheramine thermoplastic material as described herein. For example, such thermoplastic polymeric material having at least one epoxide group may be a product (e.g., a thermoplastic condensation reaction product) of a reaction of a mono-functional or di-functional species (i.e., respectively, a species having one or two reactive groups, such as an amide containing species), with an epoxide-containing moiety, such as a diepoxide (i.e., a compound having two epoxide functionalities), reacted under conditions for causing the hydroxyl moieties to react with the epoxy moieties to form a generally linear backbone polymer chain with ether linkages.

Though other functional species may be employed, as is taught in U.S. Pat. No. 6,011,111 (incorporated by reference; see, e.g., Cols. 6-8) and WO 98/14498 (incorporated by reference; see, e.g., pages 8-11) examples of such mono-functional or di-functional species may include a dihydric phenol, a secondary amine (e.g., a bis-secondary amine), a primary amine, or any combination thereof. Any amine of the functional species can be an aromatic amine, an aliphatic amine or a combination thereof. The mono-functional or di-functional species may have one or two functionalities capable of reacting with epoxide groups to form a generally non-cross-linked polymer. Some particular examples, without limitation, of functional species for reaction with an epoxy moiety in accordance with the present teachings includes an ethanolamine (e.g., monoethanolamine), piperazine or a combination thereof. Any of the illustrative functional species may be substituted or unsubstituted.

Though other epoxide-containing moieties may be employed, as is taught in U.S. Pat. No. 6,011,111 (incorporated by reference; see, e.g., Cols. 5-6), and WO 98/14498 (incorporated by reference; see, e.g., page 8) such moieties may include at least one mono-functional epoxide and/or a di-functional epoxide ("diepoxide"). An example of a diepoxide that can be employed in the teachings includes a diglycidyl ether of a dihydric phenol (e.g., resorcinol, biphenol or bisphenol A). Any epoxide-containing moiety herein may be an aliphatic and/or an aromatic epoxide.

Other examples of illustrative materials, functional species and diepoxides are described in U.S. Pat. Nos. 5,115,075; 4,438,254; 6,011,111; and WO 98/14498 (see e.g., pages 3-8) along with illustrative synthesis conditions, all incorporated by reference herein (see also U.S. Pat. Nos. 3,317,471 and 4,647,648, also incorporated by reference herein). Examples of such materials also can be found, without limitation at paragraphs 15-25 of Published U.S. patent application Ser. No. 20/070,270515 (Chmielewski et al), incorporated by reference for all purposes.

The composite structures envisioned herein may comprise panels consisting of a plurality of material layers with the reformable epoxy resin adhesive located onto and/or between the plurality of material layers. In this instance, the material layers may be of wood, paper, fabric, plastic or metal. The material layers may be a naturally occurring material (e.g., a rubber, a cellulose, sisal, jute, hemp, or some other naturally occurring material). The material layers may include a natural fiber material. The material layers may be a synthetic material (e.g., a polymer (which may be a homopolymer, a copolymer, a terpolymer, a blend, or any combination thereof)). It may be a carbon derived material (e.g., carbon fiber, graphite, graphene, or otherwise). The material layers may include fibers selected from (organic or inorganic) mineral fibers (e.g., glass fibers, such as E-glass fibers, S-glass, B-glass or otherwise), polymeric fibers (e.g., an aramid fiber, a cellulose fiber, or otherwise), carbon fibers, metal fibers, natural fibers (e.g., derived from an agricultural source), or any combination thereof. The plurality of elongated fibers may be oriented generally parallel to each other. They may be braided. They may be twisted. Collections of fibers may be woven and/or nonwoven.

The material layers may include a honeycomb or other material support structure. The material layers may comprise the same material or may comprise different materials. The material layers may include exterior veneer layers with internal layers that provide sufficient support for the external veneer layers. The composite structure may include any structure where the reformable epoxy resin can be utilized with an external veneer to provide a visually appealing exterior surface to the composite structure. In addition, the reformable epoxy resin material is capable of receiving printed material prior to forming the composite structure whereby the printed material can be clearly viewed after formation of the composite structure. Certain composite materials are disclosed in U.S. Provisional Application Nos. 62/130,832, filed Mar. 10, 2015; and 62/183,380, filed Jun. 23, 2015, the entirety of these applications being hereby incorporated by reference for all purposes.

While it is possible to use a liquid material for the adhesive, the present teachings also contemplate using an RER film. Using a film can be beneficial, as it avoids bringing significant unwanted mass to the composite structure, as a liquid adhesive may do. A film also enables the user to control the quantity and distribution of the adhesive, which may assist in handling the adhesive. The film may be located along the entirety of a surface of a material layer of the composite structure, or may be located onto only portions of a surface of a material layer. The adhesive film may be a continuous sheet or may be cut into strips or any other shape to facilitate connection between one or more material layers of the composite structure. Certain films that may be used in accordance with the teachings herein are described in U.S. Provisional Application No. 62/113,728, filed Feb. 9, 2015, the entirety of this application being hereby incorporated by reference for all purposes.

RER adhesives are advantageous as they allow for faster hardening and adhesion, thereby reducing the need for extended periods of time and large areas of space for curing adhesives in composite structures. While RER adhesives may be workable at ambient temperature, it is often desirable to have a heat applying step to soften or melt the RER adhesive to allow it to move or become more workable. Heating the resulting composite structure allows for ease of formability into a desired shape (e.g., by molding or stamping), which may have a curved profile. Adhesion and hardening of the RER begins almost immediately after heating is stopped and full adhesion can occur within about 10 seconds to about 5 minutes (e.g., about 2 minutes). It is contemplated that allowing the adhesive to return to ambient temperature is sufficient for adhesion, and additional hardening steps are possible, but not necessary. With an RER adhesive, it is also possible that the bond formed between the adhesive and the substrates of the composites can be debonded by increasing the temperature over the glass transition temperature ($T_g$) of the RER to allow the bonded substrates to be separated.

In one embodiment, the RER adhesive may be applied as a film layer to a substrate (e.g., a material layer). The substrate may be a wood-based material. The substrate may be a plastic or metallic material. A second material layer may be located over and onto the RER adhesive film layer. Additional layers of RER adhesive and material layers may be alternated to any desired thickness to make a resulting composite. Additional covering material layers (e.g., veneers) may be added to the composite, each veneer adjacent a layer of the RER film. The composite may then be heated and shaped, either simultaneously or heated and then shaped to soften the RER adhesive and form a curved composite. Cooling at ambient temperature may be sufficient to reduce the RER adhesive to a temperature below its glass transition temperature for sufficient adhering and hardening of the curved composite. The glass transition temperature of the RER adhesive may be greater than 30° C., greater than 50° C., greater than 60° C., or even greater than 70° C. The glass transition temperature of the reformable epoxy resin material may be higher than room temperature but lower than 200° C. The RER adhesive may thus be processed at a temperature of less than 200° C., or even less than 150° C.

EXAMPLES

Two pieces of ⅛" maple wood were each laminated. The first piece was laminated with a thermoset epoxy material including Araldite 1564 SP epoxy and Aradur 22962 curing agent (both available from Huntsman Corporation, The Woodlands, TX) in a ratio of about 4:1. The second piece was laminated with an RER film material in accordance with the teachings herein (two sheets of 0.005" film). All laminates were cured in a press at 75 psi and 120° C. for 15 minutes then 75 psi at 150° C. for 2 hours. A three-point bend test for flexural properties was performed at 85° C. (in accordance with ASTM D790). The thermoset laminate failed at 2.2% strain. The RER film laminate did not fail at 2.2% strain. The RER film laminate did not fail even up to 3.8% strain. Testing was stopped at 3.8% strain due to failure of the wood material (as opposed to failure of the laminating material). The thermoset laminate was thus limited by the flexibility of the thermoset epoxy, whereas the RER laminate was limited only by the flexibility of the wood. This shows that the shaping of thermoset laminates is limited by the epoxy laminate, while the RER laminate has greater flexibility. Furthermore, the tensile strengths of the thermoset laminate (41 MPa) and the RER laminate (44 MPa) are comparable. Thus the RER material is not significantly weaker than a thermoset epoxy, as may be expected from a typical thermoplastic material.

The laminates were then allowed to cool under strain. When the strain was removed, the thermoset laminate returned to its original shape. As desired, the RER laminate retained the curved shape. Thus, the RER laminate was shapeable, whereas the thermoset laminate was not. Results are shown in the table below.

| Sample Type | Thickness (mm) | Peak Load (N) | Ultimate Tensile Strength (MPa) | Strain at Break (mm/mm) | Result |
|---|---|---|---|---|---|
| Thermoset Laminate | 29.490 | 161.443 | 41.0 | 0.022 | Failed under strain at 2.2%; cooled and strain removed—returned to original shape. |

-continued

| Sample Type | Thickness (mm) | Peak Load (N) | Ultimate Tensile Strength (MPa) | Strain at Break (mm/mm) | Result |
|---|---|---|---|---|---|
| RER Laminate | 29.610 | 168.445 | 44.2 | 0.038 (no break) | No failure under strain at 3.8%; cooled and retained curved shape. |

As mentioned above, the composite materials described herein are applicable to wide range of products. RER adhesives may be used for the manufacture of furniture including chairs, tables, cupboards, bed frames, or any other type of furniture where curvature may be desired. RER adhesives may be used for the manufacture of sporting equipment such as racquets, snow boards, skis, hockey and lacrosse sticks, helmets, or the like. RER adhesives may be used for the manufacture of ballistic or other safety devices such as shields, helmets, body armor or the like. RER adhesives may be used for the manufacture of building construction materials, especially those where aesthetic presentation is important such as home and office interiors.

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for ail purposes. The term "consisting essentially of to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A method comprising:

(i) forming a substantially planar composite structure having at least two layers, and a reformable epoxy resin adhesive material between the at least two layers;

(ii) optionally cutting the composite structure to a desired shape;

(iii) heating the substantially planar composite structure in a mold to form a non-planar composite structure;

wherein the reformable epoxy resin adhesive material falls below its glass transition temperature upon exposure to ambient temperature;

after the reformable epoxy resin adhesive material falls below its glass transition temperature, it can be heated multiple times above its glass transition temperature for molding into a non-planar composite structure.

2. The method of claim 1, wherein the reformable epoxy resin adhesive material has a linear backbone.

3. The method of claim 1, wherein the reformable epoxy resin adhesive material is generally non-cross-linked.

4. The method of claim 1, wherein the reformable epoxy resin adhesive material is a polymer formed of 1) mono-functional and/or di-functional epoxides and 2) mono-functional and/or di-functional amines, wherein the amines are primary or secondary amines.

5. The method of claim 1, wherein the reformable epoxy resin adhesive material includes a dihydric phenol.

6. The method of claim 1, wherein at least one of the at least two layers includes a fibers.

7. The method of claim 1, wherein
the reformable epoxy resin adhesive material is a thermoplastic polymer that includes an aromatic epoxide and has a glass transition temperature that is higher than room temperature and less than 200° C.; and
at least one of the at least two layers is a polymer material.

8. The method of claim 1, wherein
the reformable epoxy resin adhesive material has a glass transition temperature greater than 60° C.; and
the reformable epoxy resin adhesive material falls below its glass transition temperature upon exposure to ambient temperature in less than 5 minutes.

9. The method of claim 1, wherein at least one of the at least two layers is a polymeric material different from the reformable epoxy resin adhesive material.

10. The method of claim 1, wherein at least one of the at least two layers includes a paper, a fabric, a plastic, or a fabric.

11. The method of claim 1, wherein at least one of the at least two layers includes a rubber, cellulose, sisal, jute, hemp, or other naturally occurring materials.

12. The method of claim 1, wherein the composite structure is a furniture panel, an automotive panel, or aerospace panel.

13. The method of claim 1, wherein
the reformable epoxy resin adhesive material falls below its glass transition temperature prior to forming the non-planar composite structure, and/or
the reformable epoxy resin adhesive material is stored at room temperature prior to use.

14. The method of claim 13, wherein the reformable epoxy resin adhesive material is stored in pellet form are as a film.

15. The method of claim 1, the reformable epoxy resin adhesive material is a thermoplastic polymer having a glass transition temperature greater than 50° C. and lower than 150° C. and can be processed at a temperature of less than 200° C.

16. The method of claim 15, wherein
the resulting composite structure includes natural fiber materials; and
the resulting composite structure does not fail at greater than 3.5% strain during a three-point bend test.

17. The method of claim 1, wherein the reformable epoxy resin adhesive material is provided as a film material, and the reformable epoxy resin adhesive material is generally free of cross-links.

18. The method of claim 1, wherein the method comprises a step of stamping.

19. A panel made by the method of claim 1.

* * * * *